United States Patent [19]

Taig

[11] 4,415,002
[45] Nov. 15, 1983

[54] HYDRAULIC CONTROL APPARATUS

[75] Inventor: Alistair G. Taig, South Bend, Ind.

[73] Assignee: The Bendix Corporation, Southfield, Mich.

[21] Appl. No.: 271,295

[22] Filed: Jun. 8, 1981

[51] Int. Cl.³ .............................................. F15B 9/08
[52] U.S. Cl. ............................ 137/625.23; 91/375 R
[58] Field of Search ..................... 137/625.21, 625.22, 137/625.23, 625.24; 91/375 A, 375 R

[56] References Cited

U.S. PATENT DOCUMENTS 4,057,079 11/1977 Taig .................................. 91/375 R
4,117,864 10/1978 Taig ............................... 137/625.23

*Primary Examiner*—Alan Cohan
*Attorney, Agent, or Firm*—Paul David Schoenle; Ken C. Decker

[57] ABSTRACT

A hydraulic control apparatus includes a rotatable sleeve member (50) defining a bore receiving rotatable input (32) and output (36) members. The members define aligned grooves (64, 66, 68) cooperating to define an aperture (70) movably receiving an elongated pin (72) coupling the members for rotation in unison. The pin (72) cooperates with the members to substantially define a pair of fluid flow paths. Relative rotation of the members supplies pressurized fluid from a pressure source (16) to the chambers of an actuator (44) via the pair of fluid flow paths. The pin and sleeve member cooperate to define a pressure chamber (112) receiving pressurized fluid from the pair of fluid flow paths via a passage (114). Pressurized fluid in the chamber (112) biases the pin into engagement with the input member preventing leakage of pressurized fluid from one flow path to the other at the interface of the pin and input member. The input member defines recesses cooperating with recesses on the sleeve member to define a part of the fluid flow paths. The recesses on the input member define parallel surfaces simplifying the formation of the recesses.

14 Claims, 6 Drawing Figures

HYDRAULIC CONTROL APPARATUS

The invention relates to a hydraulic control apparatus. More particularly, the invention relates to an improvement to hydraulic control apparatus of the type having coaxially arranged rotatable input and output members which are received in the bore of an elongated rotatable sleeve member. The members define axially extending grooves which in registry cooperate to define an axially extending aperture at the interface of the members. An elongated pin is received in the axially extending aperture so that the members are coupled for rotation in unison. The axially extending grooves in the sleeve and output members cooperate to define an aperture substantially coinciding to the cross section of the pin. Consequently, the pin substantially prevents relative rotation of the sleeve and output members. The axially extending groove in the input member is circumferentially enlarged so that the input member has a limited rotational freedom relative the sleeve and output members. The sleeve and input members have apertures and recesses which cooperate to define a pair of fluid flow paths. Relative rotation of the sleeve and input members causes an increased resistance to fluid flow in one path and a decrease in the fluid flow resistance of the other path. As a result, the hydraulic control apparatus may be used to control the supply of pressurized fluid to an actuator assisting rotation of the output member in response to rotation of the input member. The axially-extending groove defined by the input member and the pin cooperate to define reaction chambers connected to the fluid flow paths so that pressurized fluid in the reaction chambers causes a torque resisting relative rotation of the sleeve and input members. Additionally, a centering spring carried by the input member biases the sleeve and input member to a neutral relative position wherein the resistances to fluid flow are substantially equal in the two fluid flow paths.

A power assistance control device is known in accordance with the U.S. Pat. No. 4,057,079 (hereinafter "079"), issued Nov. 8, 1977 to Alistair G. Taig, the disclosure of which is incorporated herein by reference to the extent necessary for a complete understanding of the present invention, wherein a part analogous to the elongated pin described above is defined by a cylindrical slug. The shape of the axially extending groove in the input member is such that the input member and slug co-operate with the output member to define a double restriction in each of the two fluid flow paths of the device. As a result, the control device has a nonlinear or two-slope operating characteristics of actuator pressure versus input torque. The cylindrical slug is slidably received in the axially extending aperture so that the quality of fit between the input and output member and slug effects at least one of the flow path restrictions. Specifically, the radial clearance between the slug and the input member defines a leakage path between the reaction chambers. The leakage path effects at least one of the fluid flow path restrictions. Consequently, precise dimensional tolerances must be maintained during manufacturing of the device in order to minimize the leakage path.

An improved hydraulic control apparatus is known in accordance with the U.S. Pat. No. 4,117,864, (hereinafter "864") entitled, Power Steering Control Valve, issued Oct. 3, 1978 to A. G. Taig wherein a part analogous to the elongated pin described above is defined by a releaseable projection on the sleeve member. The releasable projection is biased radially outwardly into the axially extending groove on the sleeve member by a pair of resilient snap rings. The snap rings substantially prevent relative movement of the sleeve member and projection so that the leakage path defined between the input member and projection is not varied by radial movement of the projection. Nevertheless, precise dimensional tolerances must be maintained during manufacturing of the apparatus in order to control the fluid flow restrictions. Further, the sleeve member and the output member are coupled for rotation in unison by the releasable projection on the sleeve member. Slack, lost motion, or relative rotational freedom of the sleeve and output member results unless precise tolerances are maintained in manufacturing of the apparatus. Additionally, a centering spring is defined by a pair of leaf springs which are received in a transverse bore defined by the input member. The leaf springs extend radially outwardly from the bore and engaging the radial walls of an axially extending groove defined by the sleeve member. The leaf springs must contemporaneously engage both the input member and the sleeve member in order to prevent lost motion between the input and sleeve members. Consequently, precise control of the shape of the leaf springs and of the dimensions of the bore and groove on the input and sleeve members, respectively, must be maintained. Further, the spring-receiving grooves in the sleeve member weaken the sleeve member. Additionally, one of the input and output members includes an axially extending projection. The other of the input and output members defines a blind bore rotatably receiving the projection. Consequently, the projection and blind bore cooperate to define a pilot bearing for the input and output members.

It will be appreciated in light of the above that variations of the operating characteristics of the apparatus, as well as slack in the connection between the input and output members, are the result of a failure to maintain precise manufacturing tolerances throughout the control apparatus according to the "079" and "864" patents. Variations of the operating characteristic of the apparatus or slack between the input and output members is, more likely than not, unacceptable; particularly when the hydraulic control apparatus is employed in a power steering unit for a vehicle. Further, the apparatus illustrated in the "079" and "864" patent have recesses in the sleeve and input members which cooperate to define the pair of flow paths. The recesses must be precisely positioned relative to each other so that the fluid flow restrictions of the two flow paths are balanced in the neutral position of the valve. In order to manufacture the input and output members according to the "079" and "864" patents with sufficient precision to make the apparatus operate properly, expensive electric-discharge machining (EDM) or electro-chemical machining (ECM) processes are necessary.

Accordingly, it is an object of the invention to provide a hydraulic control apparatus which avoids one or more of the shortcomings of prior apparatus of the type described above.

A hydraulic control apparatus according to the invention includes input and output members which each define a transverse slot adjacent the other member. The transverse slots in registry cooperate to define a transverse aperture. A pair of leaf springs are received in the transverse aperture with the width of each spring disposed parallel to the axis of the input and output members. As a result, approximately one-half of the width of each leaf spring is received by each of the input and output members. Because the transverse slots are of the substantially same width, the leaf springs contemporaneously engage both the input and output members to substantially eliminate slack or lost motion between the input and output members. Additionally, because the sleeve member does not have axially extending grooves for receiving the centering spring, a sleeve member according to the invention is torsionally stronger than a sleeve member according to the "864" invention.

A hydraulic control apparatus according to the invention includes a sleeve member having an axially extending groove for receiving an elongated pin. The axially extending groove includes radially extending parallel walls. The portion of the elongated pin which is received in the groove of the sleeve member includes surfaces which are substantially parallel and which slidably engage the walls of the axially extending groove. The sleeve member groove and elongated pin cooperate to define a pressure chamber. A passage communicates pressurized fluid from the reaction chambers to the pressure chamber so that the elongated pin is biased radially inwardly into engagement with the input member by the pressurized fluid. Consequently, the leakage path defined between the elongated pin and input member of prior control apparatus is not present in the invention.

Further, an apparatus according to the invention includes an input member with a pair of recesses disposed on opposite sides of the axially extending groove. The recesses include radially extending surfaces which are parallel. Consequently, the recesses may be formed by plunge-cutting into the input member with a pair of spaced apart milling cutters. Because the spacing of the milling cutters may be easily controlled with great precision, the location of the parallel surfaces on the input member is easily controlled. The edges formed by the intersection of the parallel surfaces with the outer surface of the input member cooperate with the recesses in the sleeve member to define variable-area restrictions in the pair of flow paths. Because the locations of the edges on the input member are precisely controlled, the balancing of the flow restrictions defined in the two flow paths when the input and sleeve member are in the neutral position is more easily achieved in an apparatus according to the invention than in prior apparatus.

The advantages offered by the invention are mainly that the centering spring is carried between the input and output members so that lost motion between the members is eliminated; lost motion between the sleeve member and the output member is not realized as lost motion between the input and output members; the input and output members cooperate via the centering spring and elongated pin to define a universal joint so that angular misalignment of the members is accommodated without adversely effecting the operation of the apparatus; consequently, a pilot bearing is not needed between the input and output member; the elongated pin is hydraulically biased radially inwardly into engagement with the input member so that the leakage path defined in prior apparatus by the radial clearance of the pin and input member is absent from the invention; the recesses on the input member include parallel surfaces which facilitates the precise formation of the valve edges on the input member without expensive machining processes.

Two ways of carrying out the invention are described in detail below with reference to drawing figures which illustrate only these two specific embodiments, in which.

Figure 1:
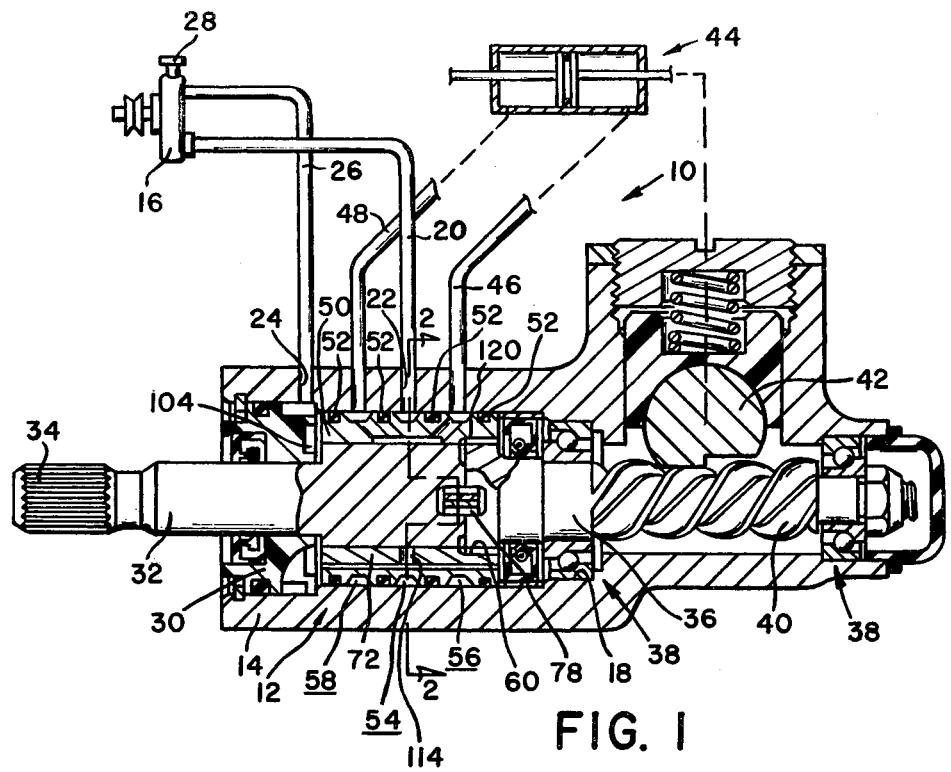
FIG. 1 is a view schematically illustrating a hydraulic control apparatus according to the invention partly in cross section taken along the line 1—1 of FIG. 2.

With reference to FIG. 1, a rack-and-pinion power steering gear for an automotive vehicle is generally referenced at 10. The steering gear 10 embodies a hydraulic control apparatus 12 according to the present invention. The housing 14 of the power steering gear 10 communicates with a constant flow fluid pressure source 16, such as a power steering pump on a vehicle (not shown). The fluid pressure source 16 is communicated with a stepped bore 18 within the housing 14 via a conduit 20 and an inlet 22 on the housing 14. An outlet 24 returns fluid from the housing 14 to a reservoir of the fluid pressure source 16 via a conduit 26. The reservoir of the fluid pressure source is vented to the atmosphere, for example, via a vented filler cap 28 on the reservoir of the power steering pump 16.

An annular plug 30 is received in the stepped bore 18. The plung 30 journals an input member 32 which extends outwardly of the housing 18. The input member 32 terminates in a splined end 34 by which the input member is coupled for rotation in unison with the steering wheel (not shown) of the vehicle. An output member 36 is journaled in the housing 14 via a pair of ball bearings 38. The output member 36 defines a pinion gear at 40 which drivingly engages the rack 42. A pair of tie rods (not shown) connect the rack 42 to the dirigible wheels of the vehicle so that translation of the rack 42 in response to rotation of the output member 36 steers the vehicle. The hydraulic control apparatus 12 couples the input and output members for rotation in unison and supplies pressurized fluid to a double acting hydraulic cylinder or actuator 44 via conduits 46 and 48. The actuator 44 assists translation of the rack 42 in response to rotation of the input member 32.

In accordance with the invention, the hydraulic control apparatus 12 includes a sleeve member 50 which is rotatably received in the stepped bore 18 of the housing 14. The sleeve member 50 carries four spaced-apart sealing members 52 which sealingly cooperate with the housing 14 to define three annular chambers 54, 56 and 58. The chamber 54 receives pressurized fluid via the conduit 20 while chambers 56 and 58 communicate with the working chambers of the actuator 44. The sleeve member 50 defines a bore 60 receiving the input and output members 32 and 36, respectively. Upon inspection of FIG. 4, it will be seen that the input member 32 and a radially extending flange 62 on the output member 36 defines circumferentially aligning grooves 64 and 66, respectively. The grooves 64 and 66 oppose an axially extending groove 68 on the sleeve member 32. In registry, the grooves 64, 66, and 68 cooperate to define an axially extending aperture 70, viewing FIG. 2. A rectangular pin 72 is received in the aperture 70 defined by the grooves 64, 66 and 68 so that the input, output, and sleeve members are coupled for rotation in unison.

Figure 2:
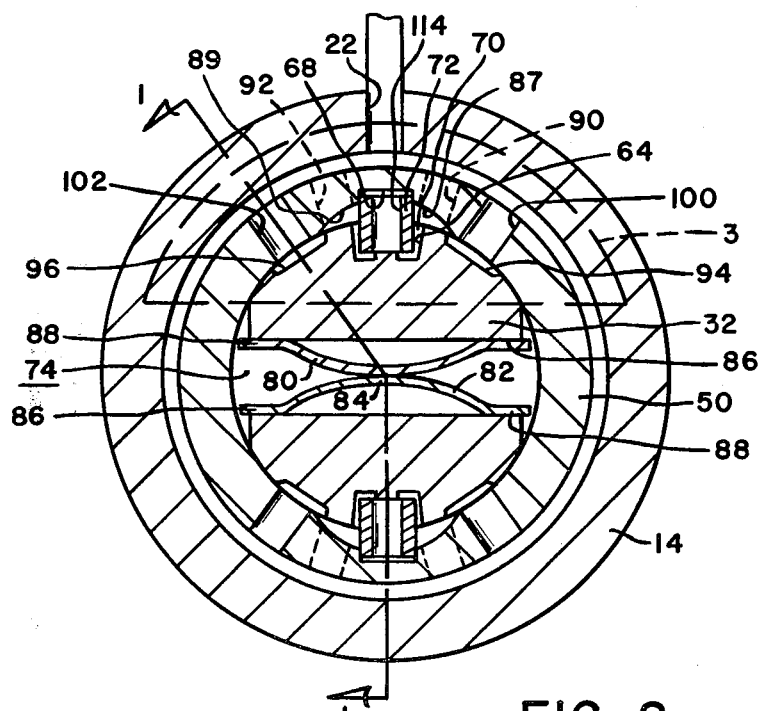
FIG. 2 is an enlarged cross-sectional view taken along the line 2—2 of FIG. 1.
Figure 3:
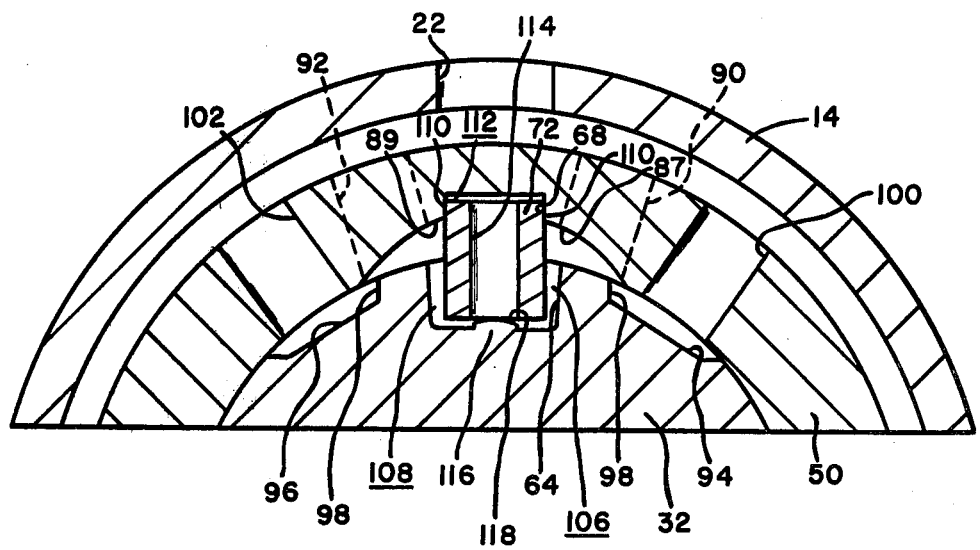
FIG. 3 is an enlarged view of an encircled portion of FIG. 2.

Turning to FIGS. 2 and 3, it will be seen that the groove 64 on input member 32 is circumferentially enlarged so that the input member has a limited rotational freedom relative the sleeve and output member.

Figure 4:
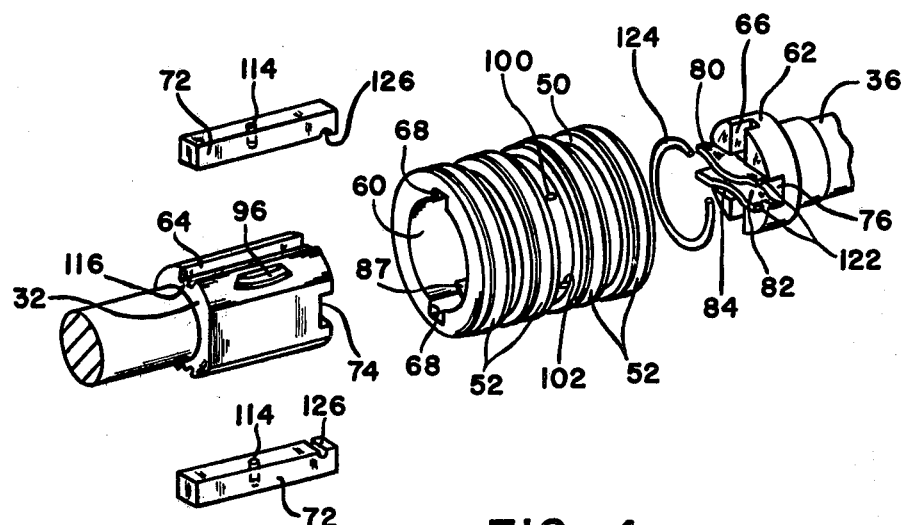
FIG. 4 is an isolated exploded assembly view of a portion of the hydraulic control apparatus.

Further, the input and output members 32 and 36 define a pair of radially extending transverse slots 74 and 76, respectively, viewing FIG. 4. The slots 74 and 76 extend axially relative the input and output members and cooperate in registry to define a transverse aperture 78, viewing FIG. 1. A pair of opposed leaf springs 80 and 82 are received in the aperture 74. The springs 80 and 82 engage each other and a point 84. Further, the springs 80 and 82 include ends 86 and 88 which are resiliently biased circumferentially away from each other because the springs are distorted in the aperture 78. Each of the input and output members receives approximately one-half the width of each spring, viewing FIGS. 1 and 4. Because the slots 74 and 76 are substantially equal in width, the springs 80 and 82 engage both the input and output members contemporaneously so that rotational slack is eliminated from the apparatus. The springs 80 and 82 bias the input and output members to a neutral relative position.

Viewing FIGS. 2, 3, and 4, it will be seen that the sleeve member 50 includes a pair of axially extending recesses 87 and 89 which are adjacent the pin 72. The recesses 87 and 89 no not open axially at the ends of the sleeve member. A pair of radial bores 90 and 92 defined in the sleeve member connect the recesses 87 and 89 to the conduits 46 and 48, respectively, via the annular chambers 56 and 58. The input member 32 defines a pair of axially extending recesses 94 and 96 which do not open axially at the ends of the input member. A portion 98 of each of the recesses 94 and 96 is parallel to the portion 98 of the other recess. A pair of radial bores 100 and 102 are defined by the sleeve member 50. The bores 100 and 102 connect the recesses 94 and 96 to the input conduit 20 via the annular chamber 54. The input, output and sleeve members cooperate with the pin 72 to define a pair of pressure communication and fluid flow paths from the inlet 22 and annular chamber 54 to the conduits 46 and 48. One communication path is defined by the bore 100, recess 94, recess 87, bore 90 and chamber 56. The other communication path is defined by the bore 102, recess 98, recess 89, bore 92, and chamber 58. The surfaces 98 cooperate with the recesses 87 and 89 to define a pair of variable-area flow restrictions in the communication paths. Additionally, both communication paths communicate with an annular chamber 104 defined in the housing 14 because the axially extending groove 64 in the input member 32 opens axially at the ends of the input member. The annular chamber 104 communicates with the outlet port 24.

Upon inspection of FIG. 3, it will be seen that the pin 72 and input member 32 cooperate to define reaction chambers 106 and 108 in the groove 64. The reaction chambers 106 and 108 communicate with the recesses 87 and 89, respectively. Further, the portion of pin 72 which is received in the groove 68 defines surfaces 110 which are substantially parallel. The radially-extending walls of the groove 68 are also substantially parallel so that the pin 72 is movable radially in the groove 68. Sleeve member 50 and pin 72 cooperate to define a chamber 112. A bore 114 extends radially through the pin 72 and connects the reaction chambers 106 and 108 to the chamber 112. The input member 32 includes a radially raised, axially extending abutment 116 in the groove 64. The abutment 116 engages the pin 72 at a surface 118 on the abutment. Surface 118 defines a radius with respect to the axis of the input member 32.

Turning now to FIGS. 1 and 4, it will be seen that the bore 60 of sleeve member 50 is stepped to provide a shoulder 120. The ends 86 and 88 of the leaf springs 80 an 82 define notches 122 which receive a wire retaining ring 124. The pin 72 defines a radially extending notch 126. The notch 126 receives the retaining ring 124 which is engageable with the shoulder 120. Consequently, the ring 124 retains the springs 80 and 82 and pin 72 in the aperture 78 and 70, respectively, while allowing radial movement of the pin 72.

Figure 5:
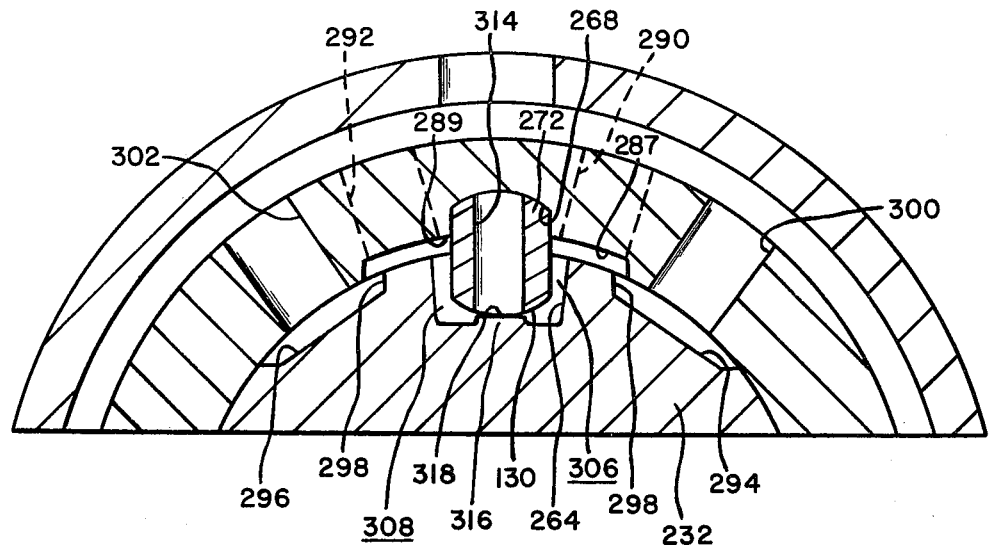
FIG. 5 is a view similar to FIG. 3 illustrating an alternative embodiment of the invention.
Figure 6:
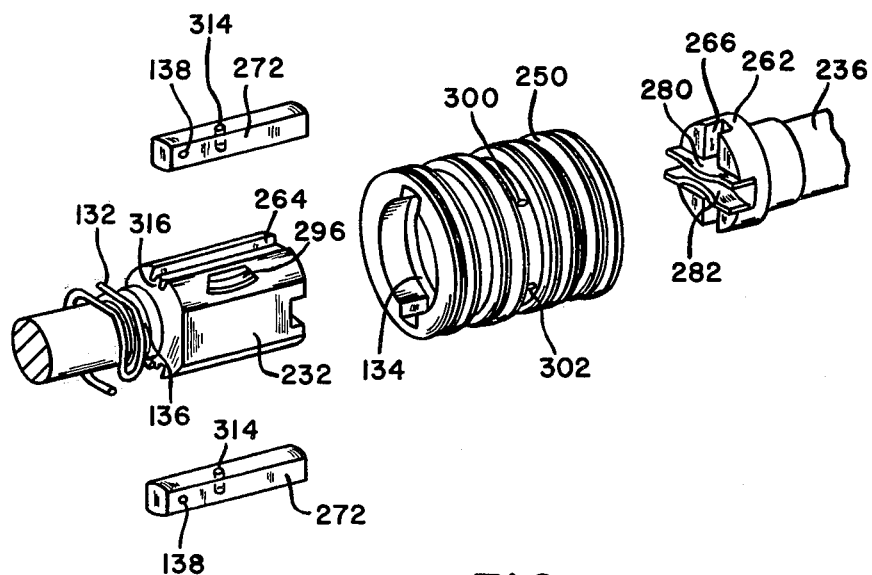
FIG. 6 is an isolated exploded assembly view of a portion of the alternative embodiment of the hydraulic control apparatus.

An alternative embodiment of the invention is illustrated by FIGS. 5 and 6. In order to obtain reference numerals for use in FIGS. 5 and 6, features which are analogous in structure or function to those illustrated in FIGS. 1-4 are referenced by the numeral used in FIGS. 1-4 and increased by 200. The embodiment of the invention illustrated by FIGS. 5 and 6 is substantially the same as the embodiment illustrated by FIGS. 1-4, with the exception of features to be hereinafter explained.

Upon inspection of FIG. 5 it will be seen that the pin 272 defines an arcuate surface 130 which slidably engages the surface 318 of abutment 316. Because of the arcuate surface 130 of pin 272, the cross-sectional area of the leakage path defined by groove 264 between the recesses 287 and 289 and the chamber 304 is increased as compared to the embodiment illustrated by FIGS. 1-4. As a result, the operating characteristic of actuator pressure versus input torque of the two embodiments of the invention are different. Those skilled in the art will recognize that the operating characteristic of the invention may be varied by changing the curvature of the arcuate surface 130 so that the cross section of the leakage path from recesses 287 and 289, to the reservoir via groove 264 and chamber 304 is varied.

FIG. 6 illustrates a retaining ring 132 which is generally S-shaped. The sleeve member 250 defines an annular groove 134. Similarly, the input member defines an annular groove 136. A circumferentially extending aperture 138 is defined by the pin 272. The retaining ring 132 is received by grooves 134 and 136 and by the aperture 138. Consequently, the pin 272 is retained axially relative the input and sleeve member and the input member 232 sleeve member 250, pin 272 and ring 132 comprise a unitary assembly for installation in the housing 14.

When a steering input is effected by a vehicle operator via the steering wheel (not shown), the input member 32 (232) is moved rotationally relative the sleeve member 50 (250) (parenthetical references to FIGS. 5 and 6 will be hereinafter omitted and considered subsumed in the reference numeral used in FIGS. 1-4, where appropriate). For example, if the input member 32 is rotated clockwise relative the sleeve member 50, the surfaces 98 cooperate with the recesses 87 and 89 so that the restriction between recesses 96 and 89 is opened and the restriction between recesses 94 and 87 is closed. At the same time, the leakage path from the recess 89 to the chamber 104 via groove 64 is reduced while the leakage path from recess 87 to chamber 104 via groove 64 is opened. As a result, pressurized fluid is communicated to the recess 89 and to one working chamber of the actuator 44 to effect a right-hand turn of the vehicle.

The other working chamber of the actuator is vented to the reservoir via the leakage path from recess 87 to chamber 104. Pressurized fluid is communicated from recess 89 to reaction chamber 108, producing a reaction torque on the input member 32 which opposes rotation of the input member 32 relative sleeve member 50. The reaction torque produced on the input member 32 is proportional to actuator chamber pressure. Additionally, pressurized fluid is communicated from reaction chamber 108 to chamber 112 via the radial bore 114. Consequently, the pin 72 is biased radially inwardly into engagement with the input member 32. Clockwise relative movement of the abutment 116 relative bore 114 substantially closes communication of the reaction chamber 106 with the bore 114 so that leakage between the reaction chambers 106 and 108 is substantially prevented.

Of course, the input member 32 is movable counter clockwise relative the sleeve member 50 to effect a left-hand turn, in which case the functions of the recesses and reaction chambers are reversed.

I claim:

1. Hydraulic control apparatus comprising a rotatable sleeve member defining a bore receiving a relatively rotatable member, said members defining axially extending grooves, said grooves in registry cooperating to define an axially extending aperture, said aperture movably receiving an elongated pin coupling said members for rotation in unison, said pin and said members cooperating to define a pair of fluid flow paths adjacent said pin for communicating pressurized fluid through said apparatus, characterized by said sleeve member and said pin cooperating to define a pressure chamber, and passage means for communicating pressurized fluid from said pair of flow paths to said pressure chamber, the axially extending groove in said sleeve member includes radially extending walls which are substantially parallel, said elongated pin including a portion which is received in the axially extending groove in said sleeve member, said portion including surfaces which are substantially parallel.

2. The invention of claim 1 wherein said elongated pin defines at least a portion of said passage means.

3. The invention of claim 1 wherein said apparatus includes means for substantially closing communication of pressurized fluid from one of said pair of fluid flow paths to said pressure chamber responsive to relative rotation of said members.

4. The invention of claim 3 wherein said elongated pin defines a radially-extending bore defining at least a part of said passage means, said closing means including a radially raised, axially extending abutment defined by said relatively rotatable member, said axially extending abutment cooperating with said radially-extending bore to substantially close communication of pressurized fluid from one of said fluid flow paths to said pressure chamber responsive to relative rotation of said members moving said axially extending abutment circumferentially relative said radially extending bore.

5. The invention of claim 4 wherein said axially extending abutment includes a surface defining a radius relative the axis of said relatively rotatable member, said surface slidably engaging said axially extending pin.

6. The invention of claim 1 wherein said axially extending pin is substantially rectangular in cross section.

7. A hydraulic control apparatus, particularly for an automotive vehicle steering gear, said apparatus comprising a housing defining a bore therein and an inlet and outlet for communicating pressurized fluid from a fluid pressure source through said housing, said housing further providing a pair of ports communicating with said bore for communicating pressurized fluid to the working chambers of a hydraulic actuator, said housing journalling coaxially arranged input and output members extending into said bore, said housing bore receiving a rotatable sleeve member defining a bore receiving said input and output members, said members defining circumferentially aligned grooves cooperating in registry to define an axially extending aperture, the groove in said input member being circumferentially enlarged, an elongated pin movably received in said aperture coupling said members for rotation in unison and limiting the relative rotation of said input and sleeve members, said input and sleeve members including recesses cooperating to define a pair of fluid flow paths communicating said inlet with said pair of ports, said input member and said elongated pin cooperating to define reaction chambers in the groove of said input member, said reaction chambers receiving pressurized fluid from said pair of fluid flow paths, said input member groove opening axially at at least one end of said input member and communicating with said outlet so that said reaction chambers define a leakage path from said pair of fluid flow paths, the groove in said sleeve member including radially extending walls which are substantially parallel, said elongated pin including radially extending substantially parallel surfaces slidably engaging the radially extending walls of said sleeve member groove, said elongated pin and sleeve member cooperating to define a pressure chamber communicating with said reaction chambers via a passage defined by said elongated pin.

8. The invention of claim 7 wherein said recesses on said input member include surfaces which are substantially parallel, said surfaces cooperating with the outer surface of said input member to define a pair of valve edges, said valve edges cooperating with said recesses on said sleeve member to control the flow of pressurized fluid through said pair of fluid flow paths.

9. The invention of claim 7 wherein said groove on said input member includes a radially raised, axially extending abutment, said abutment defining a surface slidably engaging said elongated pin.

10. The invention of claim 7 wherein said elongated pin is substantially rectangular in cross section.

11. The invention of claim 9 wherein said passage defined by said elongated pin includes a radially extending bore opening on the radially inner surface of said elongated pin, said axially extending abutment confronting said radially extending bore.

12. The invention of claim 11 wherein said axially extending abutment substantially closes fluid communication between one of said reaction chambers and said radially extending bore and opens fluid communication between the other reaction chamber and said radially extending bore responsive to relative rotation of said input and sleeve members moving said axially extending abutment relative said elongated pin.

13. The invention of claim 7 wherein said elongated pin defines an arcuate surface engaging said input member.

14. The invention of claim 7 wherein the portion of said axially extending aperture which is defined by the circumferentially aligned grooves defined by said output and sleeve members substantially coincides to the cross section of said elongated pin whereby said output and sleeve members are coupled for rotation by said elongated pin which substantially prevents relative rotation of said output and sleeve members.

* * * * *